United States Patent
Barlow et al.

(10) Patent No.: US 8,135,363 B2
(45) Date of Patent: Mar. 13, 2012

(54) METHOD AND SYSTEM FOR AN INTEGRATED CIRCUIT SUPPORTING AUTO-SENSE OF VOLTAGE FOR DRIVE STRENGTH ADJUSTMENT

(75) Inventors: Stephen J. Barlow, Conington (GB); Martin Whitfield, Sandy (GB); Timothy J. Ramsdale, Cambridge (GB)

(73) Assignee: Broadcom Corporation, Irvine, CA (US)

(*) Notice: Subject to any disclaimer, the term of this patent is extended or adjusted under 35 U.S.C. 154(b) by 1405 days.

(21) Appl. No.: 11/335,026

(22) Filed: Jan. 19, 2006

(65) Prior Publication Data

US 2006/0208247 A1  Sep. 21, 2006

Related U.S. Application Data

(60) Provisional application No. 60/652,307, filed on Feb. 12, 2005.

(51) Int. Cl.
*H04B 1/04* (2006.01)
*G06F 1/00* (2006.01)

(52) U.S. Cl. ............... 455/127.1; 455/127.2; 455/127.3; 710/1; 713/300

(58) Field of Classification Search ............... 455/127.1, 455/127.2, 130, 136, 138, 127.3, 227, 334, 455/341; 341/33, 34; 327/80, 143; 710/1; 713/300, 340
See application file for complete search history.

(56) References Cited

U.S. PATENT DOCUMENTS

| | | | | |
|---|---|---|---|---|
| 6,166,960 A | * | 12/2000 | Marneweck et al. | 365/185.28 |
| 6,184,724 B1 | * | 2/2001 | Lin | 327/80 |
| 6,769,069 B1 | * | 7/2004 | Nguyen | 713/300 |
| 6,847,230 B2 | * | 1/2005 | Mallory et al. | 326/80 |
| 7,227,350 B2 | * | 6/2007 | Shuey | 324/158.1 |
| 7,385,376 B2 | * | 6/2008 | Zolfaghari | 323/266 |

* cited by examiner

*Primary Examiner* — Yuwen Pan
(74) *Attorney, Agent, or Firm* — Brinks Hofer Gilson & Lione (57) ABSTRACT

Certain embodiments of the invention may be found in a method for integrated circuit supporting auto-sense of voltage for drive strength adjustment. The method may comprise detecting an input voltage received at an auto-sense pad integrated on a mobile multimedia processing (MMP) chip. The input voltage may be a power supply voltage of the peripheral device received during power-up of the MMP chip, power-up of the peripheral circuitry, and/or dynamically while the MMP is powered-up. The auto-sense pad may adjust drive strength of at least one other pad, which may be an output pad or a bidirectional pad, integrated on the MMP chip may be configured to operate using the determined output voltage. A rise time and/or fall time of signals output by the MMP chip may be varied by the adjustment of the drive strength.

20 Claims, 11 Drawing Sheets

METHOD AND SYSTEM FOR AN INTEGRATED CIRCUIT SUPPORTING AUTO-SENSE OF VOLTAGE FOR DRIVE STRENGTH ADJUSTMENT

CROSS-REFERENCE TO RELATED APPLICATIONS/INCORPORATION BY REFERENCE

This application makes reference to, claims priority to, and claims benefit of U.S. Provisional Patent Application Ser. No. 60/652,307 filed Feb. 12, 2005;

This application makes reference to:
U.S. patent application Ser. No. 11/335,800 filed Jan. 19, 2006;
U.S. patent application Ser. No. 11/335,801 filed Jan. 19, 2006;
U.S. patent application Ser. No. 11/302,930 filed on Dec. 14, 2005;
U.S. patent application Ser. No. 11/318,980 filed on Dec. 27, 2005;
U.S. patent application Ser. No. 11/300,388 filed on Dec. 14, 2005, now U.S. Pat. No. 7,395,385 issued Jul. 1, 2008; and
U.S. patent application Ser. No. 11/332,892 filed on Jan. 17, 2006.

Each of the above stated applications is hereby incorporated herein by reference in its entirety.

FIELD OF THE INVENTION

Certain embodiments of the invention relate to adjusting output voltage levels. More specifically, certain embodiments of the invention relate to a method and system for an integrated circuit supporting auto-sense of voltage for drive strength adjustment.

BACKGROUND OF THE INVENTION

Mobile communications have changed the way people communicate and mobile phones have been transformed from a luxury item to an essential part of every day life. The use of mobile phones today is dictated by social situations, rather than hampered by location or technology. While voice connections fulfill the basic need to communicate, and mobile voice connections continue to filter even further into the fabric of every day life, various integrated mobile multimedia applications, utilizing the mobile Internet, may be the next step in the mobile communication revolution.

Third generation and/or intermediate generation, also referred to as 3G and 2.5G respectively, for example, cellular networks offering various high speed access technologies and mobile telephones that have been specifically designed to utilize these technologies, fulfill demands for integrated multimedia applications supporting TV and audio applications utilizing advanced compression standards, high-resolution gaming applications, musical interfaces, peripheral interface support, etc. The processing requirements are being increased as chip designers take advantage of compression and higher bandwidths to transmit more information. 3G wireless applications support bit rates from 384 kilobits (Kbits)/second to 2 megabits (Mbits)/second, allowing chip designers to provide wireless systems with multimedia capabilities, superior quality, reduced interference, and a wider coverage area.

As mobile multimedia services grow in popularity and usage, factors such as power consumption, cost efficient optimization of network capacity and quality of service (QoS) will become even more essential to cellular operators than it is today. These factors may be achieved with careful network planning and operation, improvements in transmission methods, and advances in receiver techniques and chip integration solutions. To this end, carriers need technologies that will allow them to increase downlink throughput for the mobile multimedia applications support and, in turn, offer advanced QoS capabilities and speeds for consumers of mobile multimedia application services. Currently, mobile multimedia processors may not fully utilize system-on-a-chip (SOC) integration for advanced total system solution for today's mobile handsets. For example, conventional mobile processors may interface to a plurality of circuitry, where the circuitry may use different supply voltages than the conventional mobile processor. This may require interface logic for voltage translation, or manual adjustment of the output pads to enable it to transmit correct voltage levels.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for an integrated circuit supporting auto-sense of voltage for drive strength adjustment, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Various aspects of the invention may provide support for interfacing to peripherals that may be utilizing different output voltages when communicating signals to a receiving integrated circuit (IC), for example, a mobile multimedia processor. The mobile multimedia processor may output digital signals that may not be recognized by the peripherals if the voltage levels of the digital signals are different from what the peripherals are designed to receive. For example, a peripheral A may expect to receive digital signals that may be in the voltage range of devices that utilize 2.8 V DC as a supply voltage. If the mobile multimedia processor instead outputs digital signals that may be in the voltage range of devices that utilize 1.5 V DC as a supply voltage, the peripheral A may not be able to receive the signals accurately.

Certain embodiments of the invention may be found in a method for an integrated circuit supporting auto-sense of voltage for drive strength adjustment. The method may comprise detecting on a mobile multimedia processor chip an input voltage received at an auto-sense pad integrated on the mobile multimedia processor chip. The received input voltage may be a power supply voltage of the peripheral device. The input voltage may be received during the power-up of the mobile multimedia processor chip, the power-up of the peripheral circuitry, and/or dynamically while the mobile multimedia processor chip is powered-up. An auto-sense pad may adjust drive strength of at least one other pad integrated on said mobile multimedia processor chip based on the detected input voltage. At least one other pad integrated on the mobile multimedia processor chip may be configured to operate using the determined output voltage, where the other pad may be an output pad or a bidirectional pad. A rise time and/or the fall time of signals output by the other pad may be adjusted. The adjustment may comprise adjusting a current drive of the other pad.

Figure 1A:
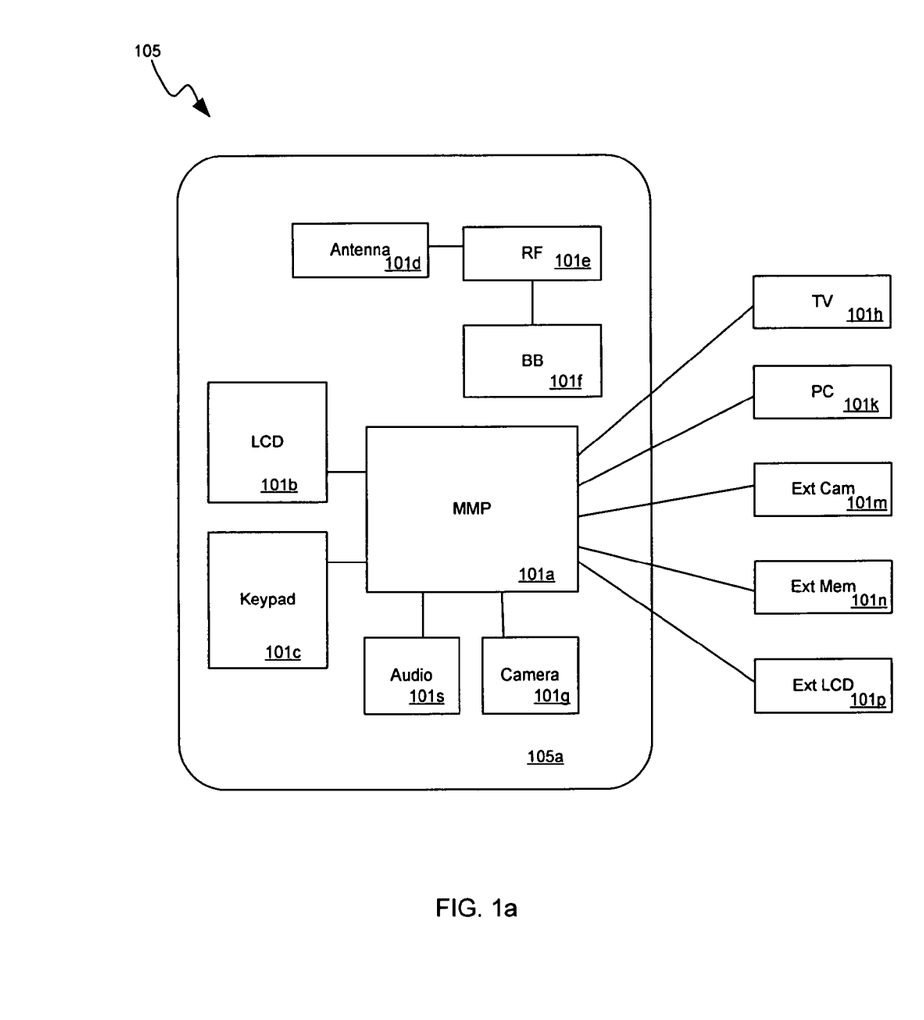
FIG. 1a is a block diagram of an exemplary mobile multimedia system, in accordance with an embodiment of the invention.

FIG. 1a is a block diagram of an exemplary mobile multimedia system, in accordance with an embodiment of the invention. Referring to FIG. 1a, there is shown a mobile multimedia system 105 that comprises a mobile multimedia device 105a, a TV 101h, a PC 101k, an external camera 101m, external memory 101n, and external LCD display 101p. The mobile multimedia device 105a may be a cellular telephone or other handheld communication device. The mobile multimedia device 105a may comprise a mobile multimedia processor (MMP) 101a, an antenna 101d, an audio block 101s, a radio frequency (RF) block 101e, a baseband processing block 101f, an LCD display 101b, a keypad 101c, and a camera 101g.

The MMP 101a may comprise suitable circuitry, logic, and/or code and may be adapted to perform video and/or multimedia processing for the mobile multimedia device 105a. The MMP 101a may further comprise a plurality of integrated interfaces, which may be utilized to support one or more external devices coupled to the mobile multimedia device 105a. For example, the MMP 101a may support connections to a TV 101h, a PC 101k, an integrable camera 101m, external memory 101n, and an integrable LCD display 101p.

In operation, the mobile multimedia device may receive signals via the antenna 101d. Received signals may be processed by the RF block 101e and the RF signals may be converted to baseband by the baseband processing block 101f. Baseband signals may then be processed by the MMP 101a. Audio and/or video signals may also be received via the integrated camera 101g, the TV 101h, the PC 101k, and/or the external camera 101m. During processing, the MMP 101a may utilize the external memory 101n for storing of processed data. Processed audio data may be communicated to the audio block 101s and processed video data may be communicated to the LCD 101b or the TV 101h, for example. The keypad 101c may be utilized for communicating processing commands and/or other data, which may be required for audio or video data processing by the MMP 101a.

Figure 1B:
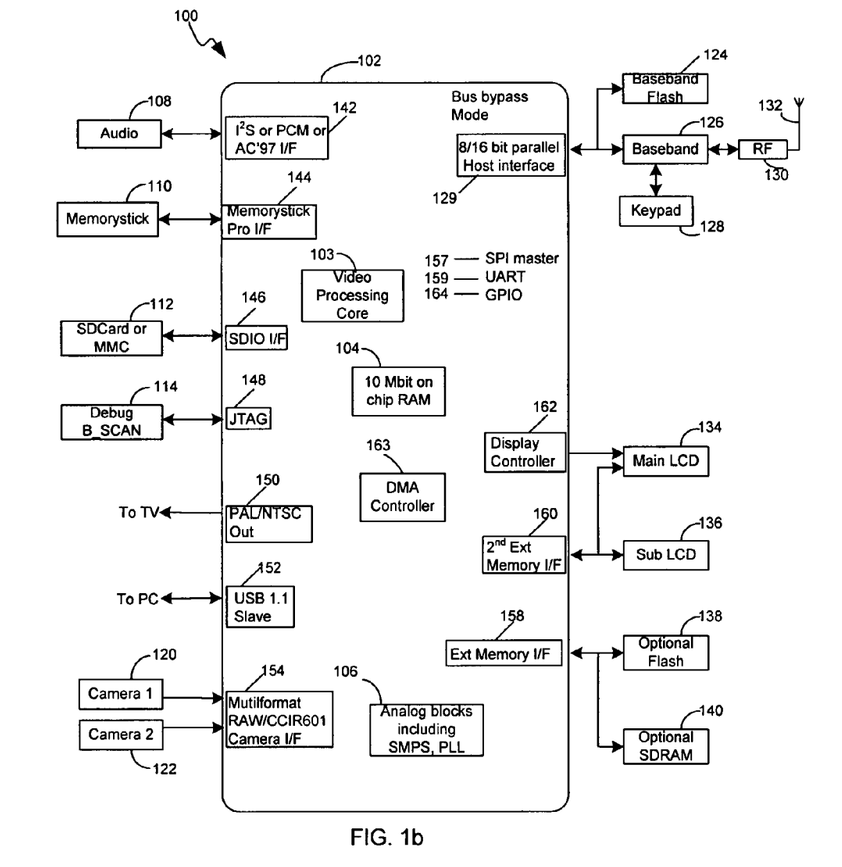
FIG. 1b is a block diagram of an exemplary mobile multimedia processor, in accordance with an embodiment of the invention.

FIG. 1b is a block diagram of an exemplary mobile multimedia processor, in accordance with an embodiment of the invention. Referring to FIG. 1b, the mobile multimedia processor 102 may comprise suitable logic, circuitry and/or code that may be adapted to perform video and/or multimedia processing for handheld multimedia products. For example, the mobile multimedia processor 102 may be designed and optimized for video record/playback, mobile TV and 3D mobile gaming, utilizing integrated peripherals and a video processing core. The mobile multimedia processor 102 may comprise a video processing core 103, RAM 104, an analog block 106, a direct memory access (DMA) controller 163, an audio interface (I/F) 142, a memory stick I/F 144, SD card I/F 146, JTAG I/F 148, TV output I/F 150, USB I/F 152, a camera I/F 154, and a host I/F 129. The mobile multimedia processor 102 may further comprise a serial peripheral interface (SPI) 157, a universal asynchronous receiver/transmitter (UART) I/F 159, general purpose input/output (GPIO) pins 164, a display controller 162, an external memory I/F 158, and a second external memory I/F 160.

The video processing core 103 may comprise suitable circuitry, logic, and/or code and may be adapted to perform video processing of data. The RAM 104 may comprise suitable logic, circuitry and/or code that may be adapted to store on-chip data such as video data. In an exemplary embodiment of the invention, the RAM 104 may be adapted to store 10 Mbits of on-chip data, for example. The size of the on-chip RAM 104 may vary depending on cost or other factors such as chip size.

The analog block 106 may comprise a switch mode power supply (SMPS) block and a phase locked loop (PLL) block. In addition, the analog block 106 may comprise an on-chip SMPS controller, which may be adapted to generate its core voltage. The core voltage may be software programmable according to, for example, speed demands on the mobile multimedia processor 102, allowing further control of power management.

In an exemplary embodiment of the invention, the normal core operating range may be about 0.8 V-1.2 V and may be reduced to about 0.6 V during hibernate mode. The analog block 106 may also comprise a plurality of PLL's that may be adapted to generate about 195 kHz-200 MHz clocks, for example, for external devices. Other voltages and clock speeds may be utilized depending on the type of application. An application may, for example, play MP3 files or play video files. The mobile multimedia processor 102 may comprise a plurality of power modes of operation, for example, run, sleep, hibernate and power down. In accordance with an embodiment of the invention, the mobile multimedia processor 102 may comprise a bypass mode that may allow a host to access memory mapped peripherals in power down mode, for example. In bypass mode, the mobile multimedia processor 102 may be adapted to directly control the display during normal operation while giving a host the ability to maintain the display during standby mode.

The audio block 108 may comprise suitable logic, circuitry and/or code that may be adapted to communicate with the mobile multimedia processor 102 via an inter-IC sound (I²S), pulse code modulation (PCM) or audio codec (AC'97) interface 142 or other suitable interface, for example. In the case of an AC'97 and/or an I²S interface, suitable audio controller, processor and/or circuitry may be adapted to provide AC'97 and/or I²S audio output respectively, in either master or slave mode. In the case of the PCM interface, a suitable audio controller, processor and/or circuitry may be adapted to allow input and output of telephony or high quality stereo audio. The PCM audio controller, processor and/or circuitry may comprise independent transmit and receive first in first out (FIFO) buffers and may use DMA to further reduce processor overhead. The audio block 108 may also comprise an audio in, audio out port and a speaker/microphone port (not illustrated in FIG. 1b).

The mobile multimedia device 100 may comprise at least one portable memory input/output (I/O) block. In this regard, the memory stick block 110 may comprise suitable logic, circuitry and/or code that may be adapted to communicate with the mobile multimedia processor 102 via a memory stick pro interface 144, for example. The SD card block 112 may comprise suitable logic, circuitry and/or code that may be adapted to communicate with the mobile multimedia processor 102 via a SD card interface 146, for example. A multimedia card (MMC) may also be utilized to communicate with the mobile multimedia processor 102 via the SD card interface 146, for example. The mobile multimedia device 100 may comprise other portable memory I/O blocks such an extreme Digital (xD) I/O card.

The debug block 114 may comprise suitable logic, circuitry and/or code that may be adapted to communicate with the mobile multimedia processor 102 via a joint test action group (JTAG) interface 148, for example. The debug block 114 may be adapted to access the address space of the mobile multimedia processor 102 and may be adapted to perform boundary scan via an emulation interface. Other test access ports (TAPs) may be utilized. The phase alternate line (PAL)/national television standards committee (NTSC) TV output I/F 150 may be utilized for communication with a TV, and the USB I/F 152 may be utilized for communications with a PC, for example. The cameras 120 and/or 122 may comprise suitable logic, circuitry and/or code that may be adapted to communicate with the mobile multimedia processor 102 via a multi-format raw CCIR 601 camera interface 154, for example. The camera I/F 154 may utilize windowing and sub-sampling functions, for example, to connect the mobile multimedia processor 102 to a mobile TV front end.

The SPI master interface 157 may comprise suitable circuitry, logic, and/or code and may be utilized to control image sensors. Two chip selects may be provided, for example, to work with two different devices. The peripherals may also work in a polled mode or interrupt mode. Furthermore, the mobile multimedia processor 102 may comprise a plurality of general purpose I/O (GPIO) pins 164, which may be utilized for user defined I/O or to connect to the internal peripherals. The display controller 162 may comprise suitable circuitry, logic, and/or code and may be adapted to support multiple displays with up to XGA resolution, for example, and to handle 8/9/16/18/21-bit video data.

The baseband flash memory 124 may be adapted to receive data from the mobile multimedia processor 102 via an 8/16 bit parallel host interface 129, for example. The host interface 129 may be adapted to provide two channels with independent address and data registers through which a host processor may read and/or write directly to the memory space of the mobile multimedia processor 102. The baseband processing block 126 may comprise suitable logic, circuitry and/or code that may be adapted to convert RF signals to baseband and communicate the baseband processed signals to the mobile multimedia processor 102 via the host interface 129, for example. The RF processing block 130 may comprise suitable logic, circuitry and/or code that may be adapted to receive signals via the antenna 132 and to communicate RF signals to the baseband processing block 126. The host interface 129 may comprise a dual software channel with a power efficient bypass mode.

The main LCD 134 may be adapted to receive data from the mobile multimedia processor 102 via a display controller 162 and/or from a second external memory interface 160, for example. The display controller 162 may comprise suitable logic, circuitry and/or code and may be adapted to drive an internal TV out function or be connected to a range of LCD's. The display controller 162 may be adapted to support a range of screen buffer formats and may utilize direct memory access (DMA) to access the buffer directly and increase video processing efficiency of the video processing core 103. Both NTSC and PAL raster formats may be generated by the display controller 162 for driving the TV out. Other formats, for example SECAM, may also be supported.

The substitute LCD 136 may comprise suitable logic, circuitry and/or code that may be adapted to communicate with the mobile multimedia processor 102 via a second external memory interface, for example. The mobile multimedia processor 102 may comprise a RGB external data bus. The mobile multimedia processor 102 may be adapted to scale image output with pixel level interpolation and a configurable refresh rate.

The optional flash memory 138 may comprise suitable logic, circuitry and/or code that may be adapted to communicate with the mobile multimedia processor 102 via an external memory interface 158, for example. The optional SDRAM 140 may comprise suitable logic, circuitry and/or code that may be adapted to receive data from the mobile multimedia processor 102 via the external memory interface 158, for example. The external memory I/F 158 may be utilized by the mobile multimedia processor 102 to connect to external SDRAM 140, SRAM, Flash memory 138, and/or external peripherals, for example. Control and timing information for the SDRAM 140 and other asynchronous devices may be configurable by the mobile multimedia processor 102.

The mobile multimedia processor 102 may further comprise a secondary memory interface 160 to connect to memory-mapped LCD and external peripherals, for example. The secondary memory interface 160 may comprise suitable circuitry, logic, and/or code and may be utilized to connect the mobile multimedia processor 102 to slower devices without compromising the speed of external memory access. The secondary memory interface 160 may provide 16 data lines, for example, 6 chip select/address lines, and programmable bus timing for setup, access and hold times, for example. The mobile multimedia processor 102 may be adapted to provide support for NAND/NOR Flash including NAND boot and high speed direct memory access (DMA), for example.

In operation, the mobile multimedia processor 102 may be adapted to support multiple display formats for displaying processed video data. For example, interlaced and/or non-interlaced external displays may be connected to the mobile multimedia processor 102 via the display controller 162. The software operating in the mobile multimedia processor 102 may communicate the external display type to the DMA controller 163. The DMA controller 163 may then access the on-chip RAM 104 and may fetch processed video data in an interlaced or non-interlaced format, corresponding to the external display type. As part of normal operation of the mobile multimedia system 105 (FIG. 1*a*), there may be runtime allocation and deallocation of memory for various software processes that may be executed by, for example, the mobile multimedia processor 102.

Figure 2:
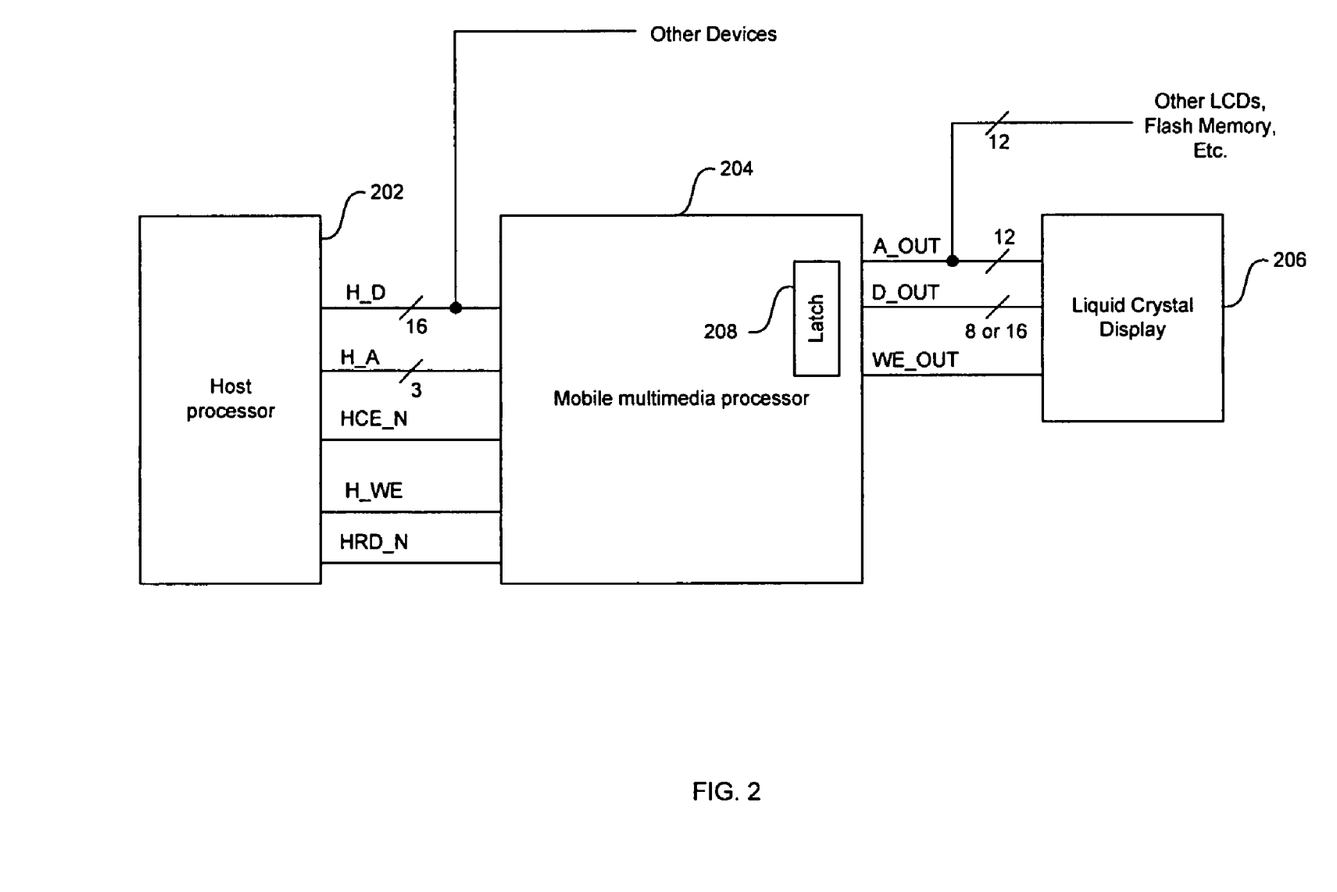
FIG. 2 shows an exemplary system for host and peripheral interfaces in a mobile multimedia processor, in accordance with an embodiment of the invention.

FIG. 2 shows an exemplary system for host and peripheral interfaces in a mobile multimedia processor, in accordance with an embodiment of the invention. Referring to FIG. 2 there is shown a host processor 202, mobile multimedia processor 204, liquid crystal display 206, and a latch 208. The host interface between the host processor 202 and the mobile multimedia processor 204 may comprise a host data signal (H_D), a host address signal (H_A), a host read select signal (HRD_N), a host chip select signal (HCE_N), and a host write enable signal (H_WE). The peripheral interface between the liquid crystal display (LCD) 206 and the mobile multimedia processor 204 may comprise a data out signal (D_OUT), an address out signal (A_OUT), and a write enable out signal (WE_OUT).

The host data signal (H_D) may comprise a plurality of parallel bits of binary information, for example, 16 bits, which may be communicated between the host processor 202 and the mobile multimedia processor 204. The host data signal (H_D) may also be communicated to other devices. The host address signal (H_A) may comprise a plurality of binary address bits, for example, 3 bits, which may be communicated between the host processor 202 and the mobile multimedia processor 204. The host write enable signal (H_WE) may comprise a write enable signal that may be communicated between the host processor 202 and the mobile multimedia processor 204.

The address out signal (A_OUT) may comprise a plurality of binary address bits, for example, 6 bits, which may be communicated between the mobile multimedia processor 204 and the LCD 206. A plurality of bits from the address out signal (A_OUT), for example, at least 4 bits, may be communicated to other devices such as, for example, LCDs and flash memory. In the example illustrated in FIG. 2, 12 bits may be used between the mobile multimedia processor 204 and the LCD 206, and 12 bits may also be used between the mobile multimedia processor 204 and another device. The data out signal (D_OUT) may comprise a plurality of parallel bits of binary information, for example 8 bits or 16 bits, which may be communicated between the mobile multimedia processor 204 and the LCD 206. The write enable out signal (WE_OUT) may comprise a write enable signal that may be communicated between the mobile multimedia processor 204 and the LCD 206. The address out signal (A_OUT), data out signal (D_OUT), and write enable out signal (WE_OUT) may be communicated to the LCD 206 by the mobile multimedia processor 204 via a latch 208.

In operation the host processor 202 may communicate data, via the host data signal (H_D), to the mobile multimedia processor 204 that is to be written to a location based on the host address signal (H_A). The host address signal (H_A) may be communicated by the host processor 202 to the mobile multimedia processor 204. The host processor 202 may also communicate information to the mobile multimedia processor 204, via the host write enable signal (H_WE). The host write enable signal (H_WE) may enable the mobile multimedia processor 204 to store the data communicated in the host data signal (H_D) at a location based on the host address signal (H_A). The mobile multimedia processor 204 may perform a series of processing steps on the data received via the host data signal (H_D) to generate a resultant output. The resultant output may be stored in a latch 208 and presented to the LCD 206. The resultant output presented by the latch 208 may comprise output data, which may be communicated to the LCD 206 via the data out signal (D_OUT), an output address, which may be communicated to the LCD 206 via the address out signal (A_OUT), and a write enable signal, which may be communicated to the LCD 206 via the write enable out signal (WE_OUT). The write enable out signal (WE_OUT) may enable the LCD 206 to store the data communicated in the data out signal (D_OUT), at a location based on the address out signal (A_OUT).

Figure 3:
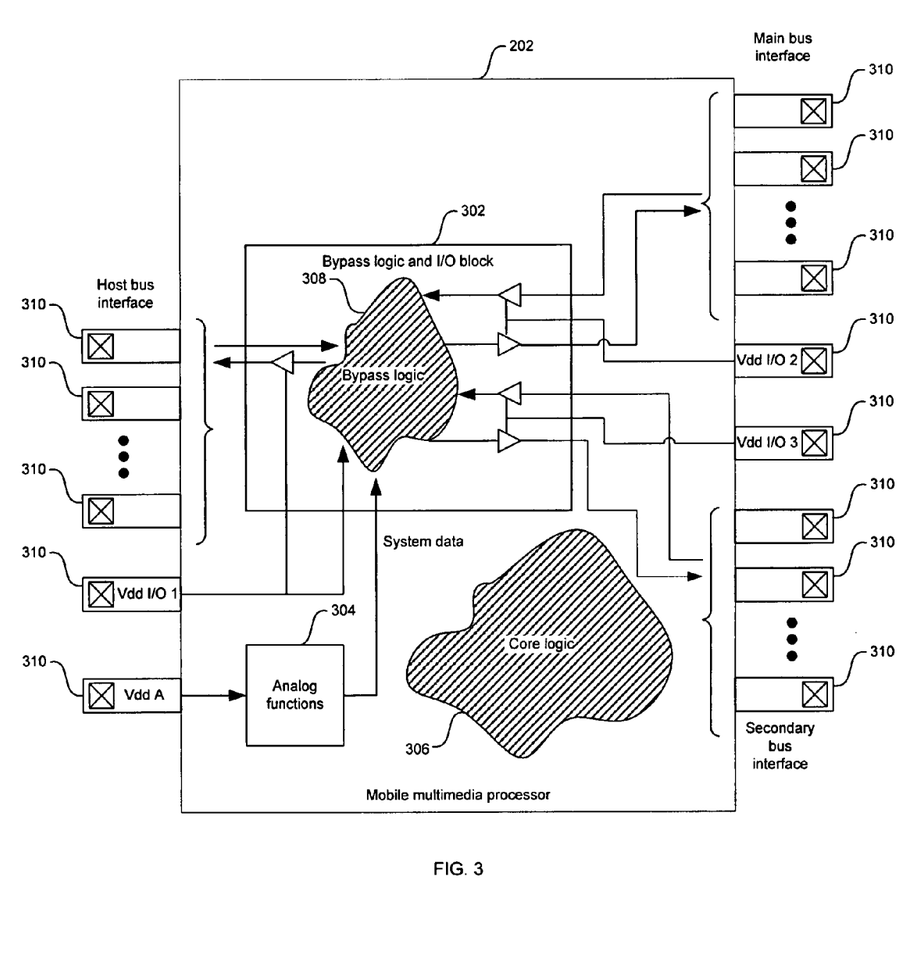
FIG. 3 is a block diagram of an exemplary bypass logic system in a mobile multimedia processor, in accordance with an embodiment of the invention.

FIG. 3 is a block diagram of an exemplary bypass logic system in a mobile multimedia processor, in accordance with an embodiment of the invention. Referring to FIG. 3 the mobile multimedia processor 204 in FIG. 2 may comprise a bypass logic and input/output (I/O) block 302, an analog functions block 304, a core logic block 306, and a plurality of pads 310. The bypass logic and I/O block 302 may comprise a bypass logic block 308. The bypass logic and I/O block 302 may also comprise logic in the plurality of pads 310 and may utilize the Vdd I/O 1 supply voltage to power the operations of the bypass logic block 308. The bypass logic block 308 may comprise suitable logic, circuitry, and/or code that may be adapted to connect the host processor 202 to a peripheral device coupled via a slave bus to the mobile multimedia processor 204. The analog functions block 304 may comprise suitable logic, circuitry, and/or code that may be adapted to generate a plurality of system data signals that may be utilized by the bypass logic and I/O block 302. For example, the system data signals may indicate whether a USB or other external bus is present or whether a bypass mode is implemented. The analog functions block 304 may utilize a Vdd A supply voltage provided via the plurality of pads 310.

The core logic 306 may comprise suitable logic, circuitry, and/or code that may be adapted to perform multimedia processing operations on data, video, and/or audio content provided from either the host processor 202 or from peripheral devices coupled to the mobile multimedia processor 204 via a slave bus. The plurality of pads 310 may comprise suitable hardware for coupling the mobile multimedia processor 204 to the host processor 202 via a host bus interface and to at least one peripheral device via a main bus interface and a secondary bus interface. The main bus and the secondary bus may be referred to as slave busses. The host bus interface operations may utilize the Vdd I/O 1 supply voltage, the main bus interface operations may utilize a Vdd I/O 2 supply voltage, and the secondary bus interface operations may utilize a Vdd I/O 3 supply voltage. The Vdd I/O 1 supply voltage, the Vdd I/O 2 supply voltage, and the Vdd I/O 3 supply voltage may be provided via the plurality of pads 310. In this regard, the signals to and from the slave buses may be level shifted. The operation of the bypass logic and I/O block 302 may require various combinations of the input voltages, where Vdd I/O 1, 2, and 3 may be either 1.5 V to 2.8 V, for example. The core logic 306 may operate at 1.2 V, for example.

In operation, the bypass logic 308 may become active when the core logic 306 has been powered down or is hibernating. The use of the bypass block 308 facilitates communication between the host processor 202, accessing the mobile multimedia processor 204 via the host bus interface and devices coupled to the two slave busses via the main bus interface and the secondary bus interface. One of the slave busses may be selected at a time and the appropriate host bus cycles may be routed through the bypass logic block 308 to the selected slave bus. The bypass logic block 308 may utilize level converters to automatically accommodate the different I/O voltages of the other ports. The bypass logic block 308 may be disabled when the core logic 306 is in operation.

Figure 4A:
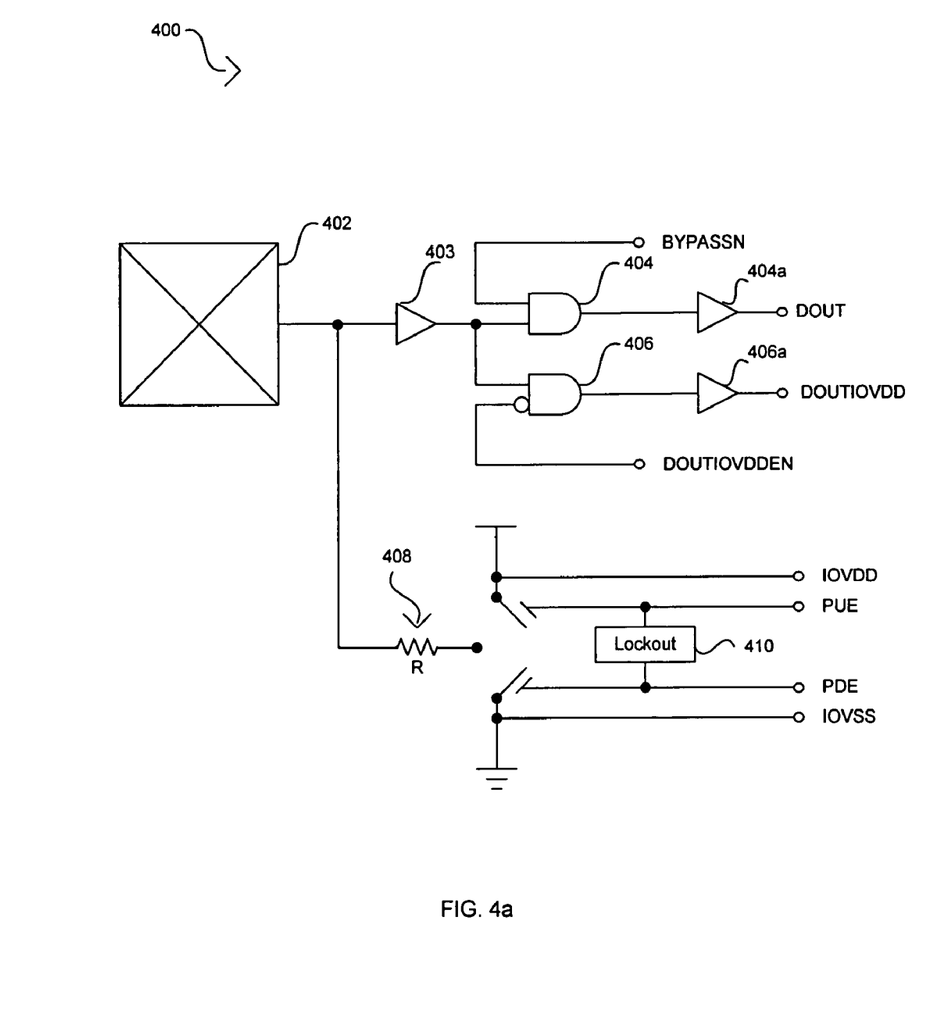
FIG. 4a is a block diagram of an exemplary input pad for a mobile multimedia processor with bypass mode capabilities, in accordance with an embodiment of the invention.

FIG. 4a is a block diagram of an exemplary input pad for a mobile multimedia processor with bypass capabilities, in accordance with an embodiment of the invention. Referring to FIG. 4a, an input pad 400 may comprise a contact pad 402, buffers 403, 404a, and 406a, AND gates 404 and 406, a resistor (R) 408, and a lockout block 410. The contact pad 402 may be utilized for connecting a signal from an external device with either the internal operations of the mobile multimedia processor 204 or with peripheral devices coupled to the main bus or the secondary bus. The buffer 403 may comprise suitable logic and/or circuitry that may be adapted to receive an input signal from the contact pad 402.

The AND gate 404 may comprise suitable logic and/or circuitry that may be adapted to perform a logic AND operation on a bypass selection signal (BYPASSN) and the input pad signal. When signal BYPASSN is high, the output DOUT of the AND gate 404 is the input pad signal and is connected to the core logic block 306. The AND gate 406 may comprise suitable logic and/or circuitry that may be adapted to perform a logic AND operation on an inverse of an enable signal (DOUTIOVDDEN) and the input pad signal. When signal DOUTIOVDDEN is low, the output signal DOUTIOVDD of the AND gate 406 is the input pad signal and is connected to the bypass logic block 308.

The buffers 404a and 406a may comprise suitable logic and/or circuitry that may be adapted to provide the current necessary to drive capacitive loads. In this regard, when driven devices are far from the contact pad 402, the buffers 404a and 406a may be configured to provide more current.

In an exemplary embodiment of the invention, the contact pad 402 may communicate a received signal to an input of the buffer 403 and to a first terminal of the resistor 408. The output of the buffer 403 may be communicated to an input of each of the AND gates 404 and 406. A signal BYPASSN may be communicated to another input of the AND gate 404, and an output of the AND gate 404 may be communicated to the buffer 404a. The output of the buffer 404a may be a signal DOUT. A signal DOUTIOVDDEN may be communicated to an inverting input of the AND gate 406, and an output of the AND gate 406 may be communicated to the buffer 406a. The output of the buffer 404a may be a signal DOUTIOVDD.

The resistor 408, which may be, for example, 30 kilo-Ohms, may be utilized to provide pull-up (PU) or pull-down (PD) capabilities on the input pad signal. For example, a pull-up enable (PUE) or a pull-down enable (PDE) signal may be utilized to provide pull-up or pull-down termination, respectively, to the input pad by coupling a second terminal of the resistor 408 to a supply voltage (IOVDD) or ground (IOVSS), respectively. Pull-up and pull-down operations may be programmable. In some instances, the PUE may be tied to the supply voltage IOVDD and the PDE may be tied to the IOVSS. The lockout block 410 may comprise suitable logic and/or circuitry that may be adapted to provide lockout capabilities to the input pad 400. For example, if both the pull-up enable (PUE) and the pull-down enable (PDE) signals are asserted, then neither pull-up nor pull-down may be applied.

Figure 4B:
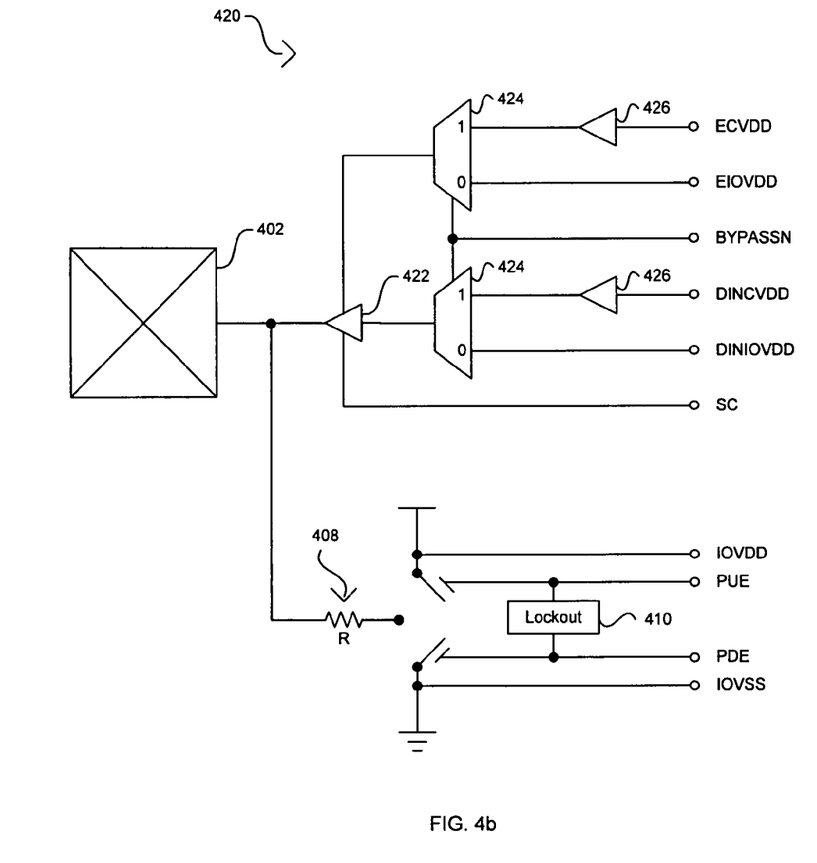
FIG. 4b is a block diagram of an exemplary output pad for a mobile multimedia processor with bypass mode capabilities, in accordance with an embodiment of the invention.

FIG. 4b is a block diagram of an exemplary output pad for a mobile multimedia processor with bypass capabilities, in accordance with an embodiment of the invention. Referring to FIG. 4b, an output pad 420 may be a tri-statable pad and may comprise a contact pad 402, an output buffer 422, multiplexers 424, buffers 426, a resistor (R) 408, and a lockout block 410. The contact pad 402, the resistor 408, and the lockout block 410 may be similar to those described in FIG. 4a. The output buffer 422 may comprise suitable logic and/or circuitry that may be adapted to provide the necessary capacity to drive the contact pad 402 and a device connected to the contact pad 402. The drive strength select (SC) signal may be utilized to modify the drive of the output buffer 422.

In an exemplary embodiment of the invention, a signal DINCVDD may be communicated to an input of a first buffer 426, and the output of the first buffer 426 may be communicated to a first input of a first multiplexer 424. A signal DINIOVDD may be communicated to a second input of the first multiplexer 424. An output of the first multiplexer 424 may be communicated to an input of the output buffer 422. A bypass selection signal (BYPASSN) may be utilized to select an output signal that may be communicated to an input of the output buffer 422. The signal DINCVDD may be from the core logic block 306 and the signal DINIOVDD may be from the bypass logic block 308. An output of the output buffer 422 may be communicated to the contact pad 402. The output of the output buffer 422 may also be communicated to a first terminal of the resistor 408. A second terminal of the resistor 408 may be connected to a supply voltage (IOVDD) or ground (IOVSS), respectively to provide pull-up or pull-down termination, respectively, as in FIG. 4a.

Additionally, the output buffer 422 may also be put in to a tri-state mode where it may not drive a signal, and its output impedance may be high. When in the tri-state mode, the contact pad 402 may receive input signals, and there may not be interference between the received input signals and the signals from the output buffer 422. The bypass selection signal (BYPASSN) may be utilized to select the tri-state signal that may put the output buffer 422 in tri-state mode. The tri-state signal may be selected from the signal ECVDD from the core logic block 306 or from the signal EIOVDD from the bypass logic block 308. The signal ECVDD may be communicated to an input of a second buffer 426, and an output of the first buffer 426 may be communicated to an input of a second multiplexer 424. The signal EIOVDD may be communicated to a second input of the second multiplexer 424. The buffers 426 may comprise suitable logic and/or circuitry that may be adapted to level shift the output signals with respect to the input signals.

Figure 4C:
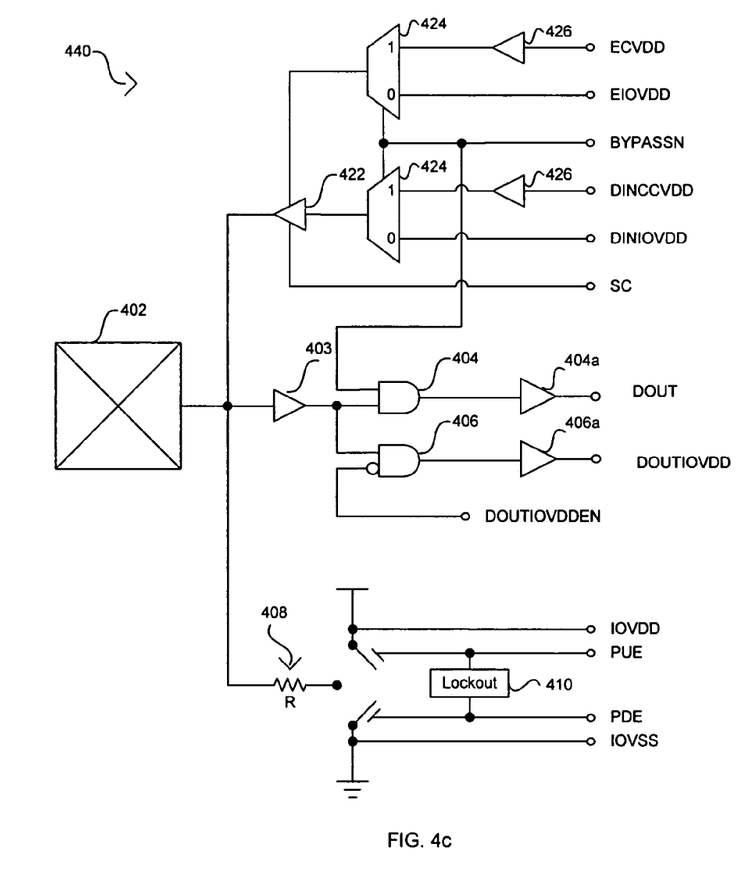
FIG. 4c is a block diagram of an exemplary bidirectional pad for a mobile multimedia processor with bypass mode capabilities, in accordance with an embodiment of the invention.

FIG. 4c is a block diagram of an exemplary bidirectional pad for a mobile multimedia processor with bypass capabilities, in accordance with an embodiment of the invention. Referring to FIG. 4c, the bidirectional pad 440 may comprise portions of the logic and/or circuitry of the input pad 400 (FIG. 4a) to drive signals received from the contact pad 402 to the core logic block 306 or the bypass logic block 308. Moreover, the bidirectional pad 440 may also comprise portions of the logic and/or circuitry of the output pad 420 (FIG. 4b) to drive signals received from the core logic block 306 or the bypass logic block 308 to the contact pad 402. The bidirectional pad 440 may also comprise suitable logic as described in FIGS. 4a and 4b to provide selectable pull-up or pull-down of the pad signal.

Accordingly, an output buffer 422, buffers 426, and the multiplexers 424 may be used similarly as described in FIG. 4b to output signals to a contact pad 402. A buffer 403 and AND gates 404 and 406 may be used similarly as described in FIG. 4a to receive signals from the contact pad 402. The resistor 408 and lockout circuit 410 may be used similarly as described in FIG. 4a and FIG. 4b to provide pull up or pull down termination.

Figure 4D:
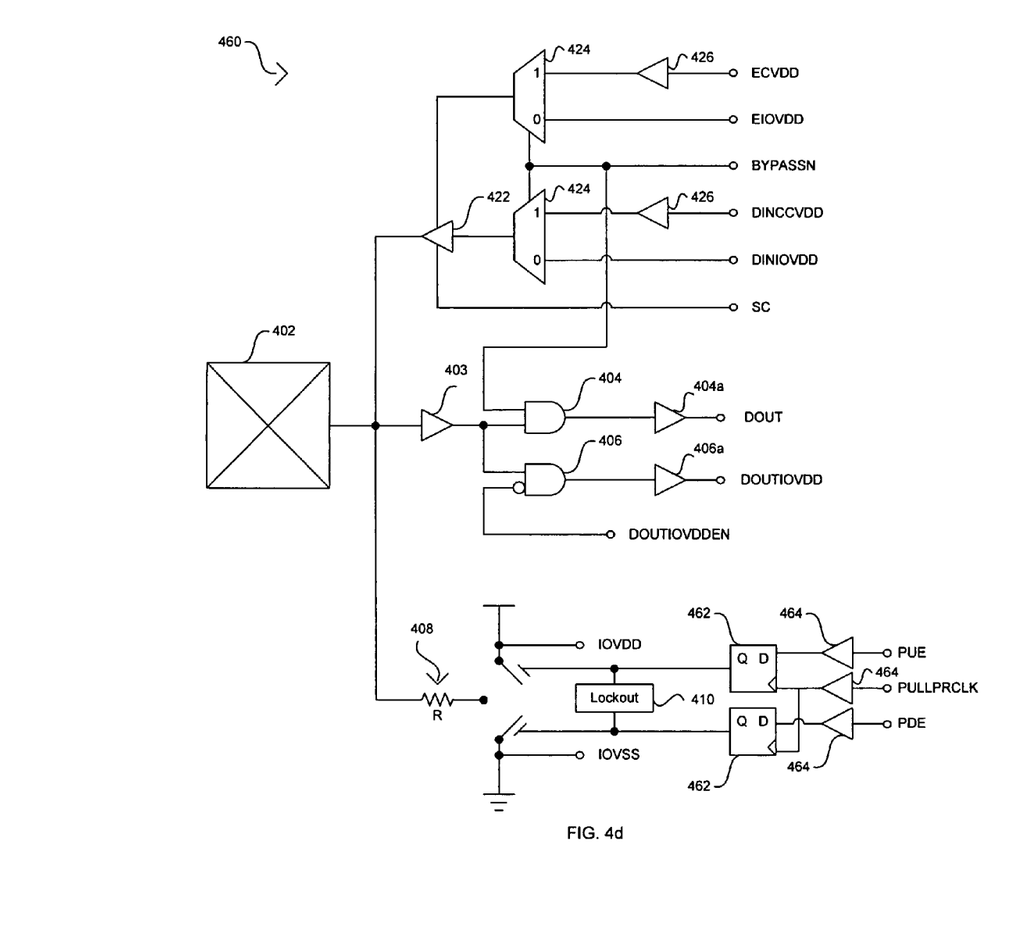
FIG. 4d is a block diagram of an exemplary bidirectional pad with programmable pulling resistors for a mobile multimedia processor with bypass mode capabilities, in accordance with an embodiment of the invention.

FIG. 4d is a block diagram of an exemplary bidirectional pad with programmable pulling resistors for a mobile multimedia processor with bypass capabilities, in accordance with an embodiment of the invention. Referring to FIG. 4d, a bidirectional pad 460 may differ from the bidirectional pad 440 in FIG. 4c in that the pull-up and pull-down capabilities may be programmable. In this regard, the bidirectional pad 460 may additionally comprise buffers 464 and D flip-flops 462. The buffers 464 may comprise suitable logic and/or circuitry that may be adapted to level shift the PUE and PDE signals and the clocking signal (PULLPRCLK). The PULLPRCLK signal may be utilized to clock the PUE and PDE signals to the D flip-flops 462 to select either pull-down or pull-up capabilities.

A signal PUE may be communicated to an input of a first buffer 464, and an output of the first buffer 464 may be communicated to a D input of a first D flip-flop 462. A Q output of the first D flip-flop may be utilized to select pull-up capability. Similarly, a signal PDE may be communicated to an input of a second buffer 464, and an output of the second buffer 464 may be communicated to a D input of a second D flip-flop 462. A Q output of the second D flip-flop may be utilized to select pull-down capability. A clock signal PULLPRCLK may be communicated to an input of a third buffer 464, and an output of the third buffer 464 may be communicated to clock inputs of the first D flip-flop 462 and the second D flip-flop 462.

Figure 5:
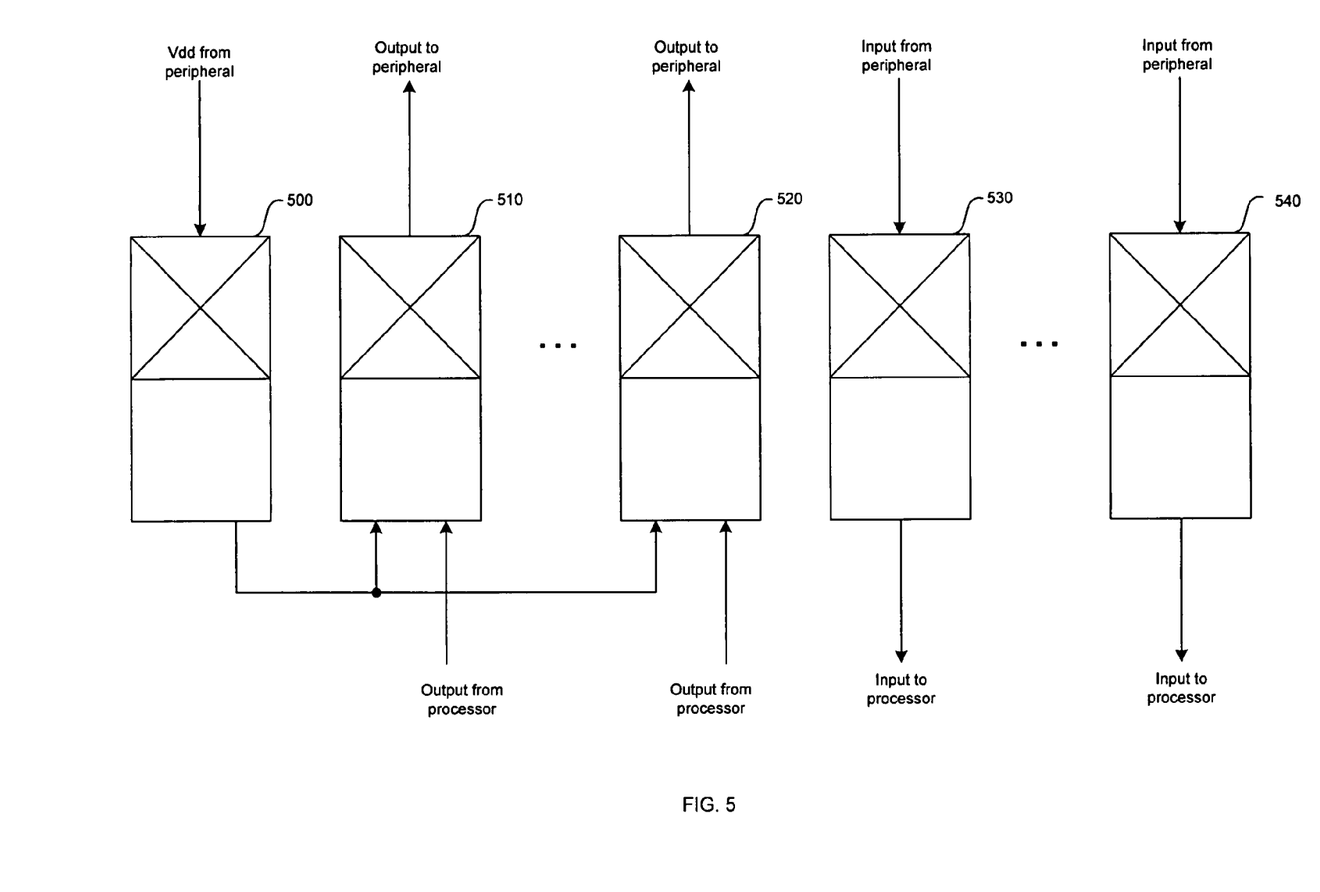
FIG. 5 is a block diagram illustrating exemplary auto-sense pad for output pad voltage control, in accordance with an embodiment of the invention.

FIG. 5 is a block diagram illustrating exemplary auto-sense pad for output pad voltage control, in accordance with an embodiment of the invention. Referring to FIG. 5, there is shown input pads 500, 530, . . . , 540, and output pads 510, . . . , 520. The input pads 500, 530, . . . , 540 may be pads that may be substantially as described in FIG. 4a. The input pads 500, 530, . . . , 540 may receive signals from, for example, an external memory 101n (FIG. 1a), and may communicate the received signals to, for example, core logic 306 (FIG. 3). The output pads 510, . . . , 520 may be unidirectional output pads substantially as described in FIG. 4b, or they may be bidirectional pads substantially as described in FIG. 4c and/or FIG. 4d. The output pads 510, . . . , 520 may receive signals from, for example, the core logic 306, and communicate those signals to, for example, an external memory 101n. Additionally, the input pad 500 may be an auto-sense pad that may comprise suitable logic and/or circuitry that may be adapted to sense voltage level of a peripheral voltage Vdd that may be communicated to it and indicate to other output pads a correct output voltage that is to be utilized. The input pad 500 may be coupled to the output pads 510, . . . , 520.

In operation, the input pads 500, 530, . . . , 540 and the output pads 510, . . . , 520 may be pads which may be connected to other ICs via conductive paths, for example, on a printed circuit board. During power up, the auto-sense pad 500 may sense the peripheral supply voltage Vdd and determine the voltage of Vdd. The Vdd may be the supply voltage that may be utilized by peripheral circuitry, for example, the external memory 101n (FIG. 1a), coupled to the IC that the auto-sense pad 500 is a part of. Based on the determined voltage level of the supply voltage Vdd, the auto-sense pad 500 may determine the correct voltage levels that may be utilized to drive signals to the peripheral circuitry by the output pads, for example, the output pads 510, . . . , 520.

The auto-sense pad 500 may also indicate to the output pads 510, . . . , 520 to adjust the rise and fall times of the output signals in order to satisfy the requirements of the receiving peripheral. For example, if the rise and/or fall time is too slow, the receiving peripheral circuit may detect glitches due to noise when the signal voltage is between the voltage levels for logic "0" and logic "1." If the rise and/or fall time is too fast, the receiving circuitry may not be able to damp the received signal, and ringing may occur. Depending on the severity of the ringing, the receive circuitry may detect glitches, and/or fail to receive data. Rise and fall times may depend on factors such as, for example, capacitive load and current drive capacity. Therefore, the current drive may be increased or decreased in order to adjust the rise and fall times.

Figure 6:
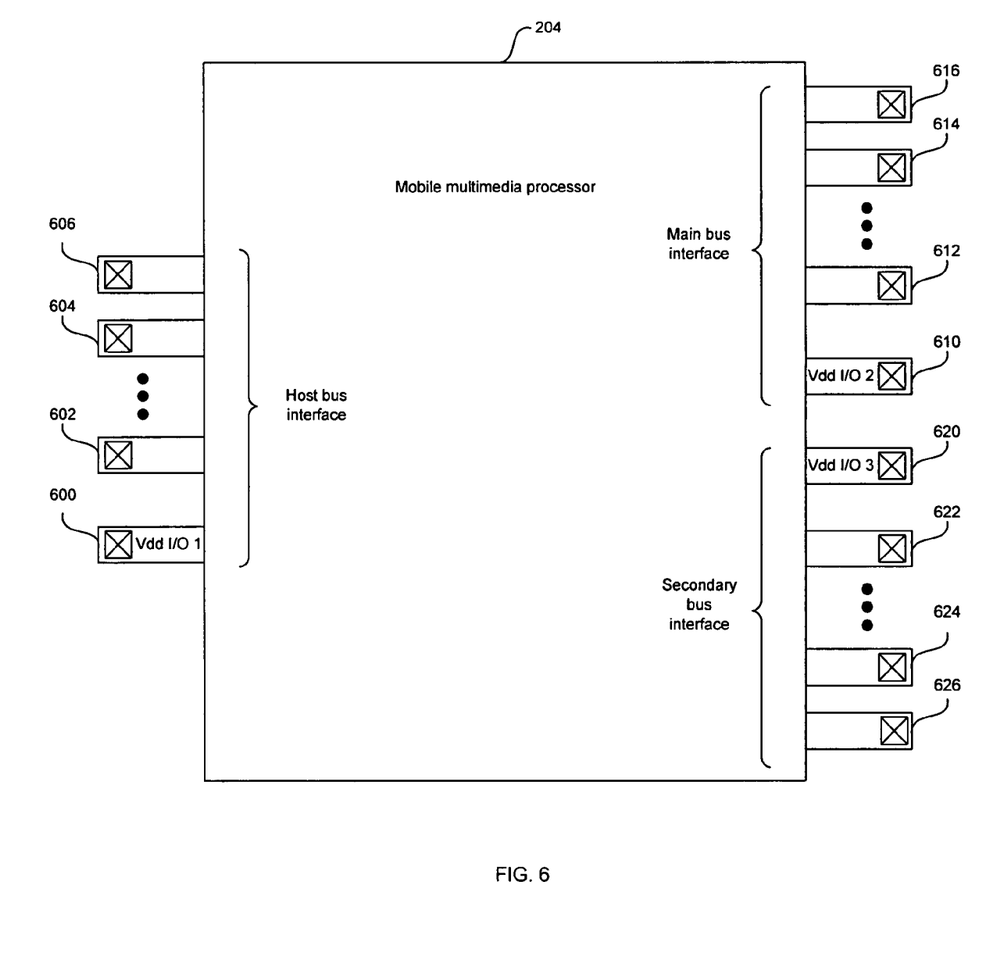
FIG. 6 is a block diagram illustrating exemplary auto-sense pad configuration in a mobile multimedia processor, in accordance with an embodiment of the invention.

FIG. 6 is a block diagram illustrating exemplary auto-sense pad in a mobile multimedia processor, in accordance with an embodiment of the invention. Referring to FIG. 6, there is shown a mobile multimedia processor 204, auto-sense pads 600, 610, and 620, and input and/or output pads 602, . . . , 604, 606, 612, . . . , 614, 616, 622, . . . , 624, and 626. The auto-sense pads 600, 610, and 620 may be substantially as described in FIG. 5. The input and/or output pads 602, . . . , 604, 606, 612, . . . , 614, 616, 622, . . . , 624, and 626 may be substantially as described in FIGS. 4a, 4b, 4c and/or 4d.

The auto-sense pad 600 and the input and/or output pads 602, . . . , 604, 606 may be, for example, a host bus interface. The auto-sense pad 610 and the input and/or output pads 612, . . . , 614, 616 may be, for example, a main bus interface, and the auto-sense pad 620 and the input and/or output pads 622, . . . , 624, and 626 may be, for example, a secondary bus interface. The main bus and the secondary bus may be referred to as slave busses. The host bus interface operations may utilize the Vdd I/O 1 supply voltage, the main bus interface operations may utilize a Vdd I/O 2 supply voltage, and the secondary bus interface operations may utilize a Vdd I/O 3 supply voltage.

In operation, the pads 600, 602, . . . , 604, and 606 may be coupled to pads of other ICs that communicate via the host bus. The pads 610, 612, . . . , 614, and 616 may be coupled to pads of other ICs that communicate via the main bus, and the pads 620, 622, . . . , 624, and 626 may be coupled to pads of other ICs that communicate via the secondary bus. During power up of the mobile multimedia processor 204, the auto-sense pad 600 may detect the voltage level of the Vdd I/O 1 voltage that may be communicated to the auto-sense pad 600. The auto-sense pad 600 may then communicate to those of the pads 602, . . . , 604, and 606 that may output signals on the host bus the appropriate voltage levels that may be utilized. In this manner, the peripheral circuits that may be coupled to the host bus may receive signals that are within an expected voltage range.

Similarly, the auto-sense pad 610 may detect the voltage level of the Vdd I/O 2 voltage that may be communicated to the auto-sense pad 610 during power up of the mobile multimedia processor 204. The auto-sense pad 610 may then communicate to those of the pads 612, . . . , 614, and 616 that may output signals on the main bus the appropriate voltage levels that may be utilized to communicate with other ICs that may be connected to the main bus. Additionally, the auto-sense pad 620 may detect the voltage level of the Vdd I/O 3 voltage that may be communicated to the auto-sense pad 620 during power up of the mobile multimedia processor 204. The auto-sense pad 620 may then communicate to those of the pads 622, . . . , 624, and 626 that may output signals on the secondary bus the appropriate voltage levels that may be utilized to communicate to the other peripheral devices that may be connected to the secondary bus.

Although only a few of the pads that may be present on the mobile multimedia processor 204 may be shown in FIG. 6, the invention need not be limited in this manner. A plurality of pads on the mobile multimedia processor 204 may be configured or arranged into groups of pads so that each group may comprise pads that communicate to devices that have a common Vdd voltage. Each group may then have an auto-sense pad associated with it that may indicate to the output pads in the group the correct voltage range for the output signals.

Figure 7:
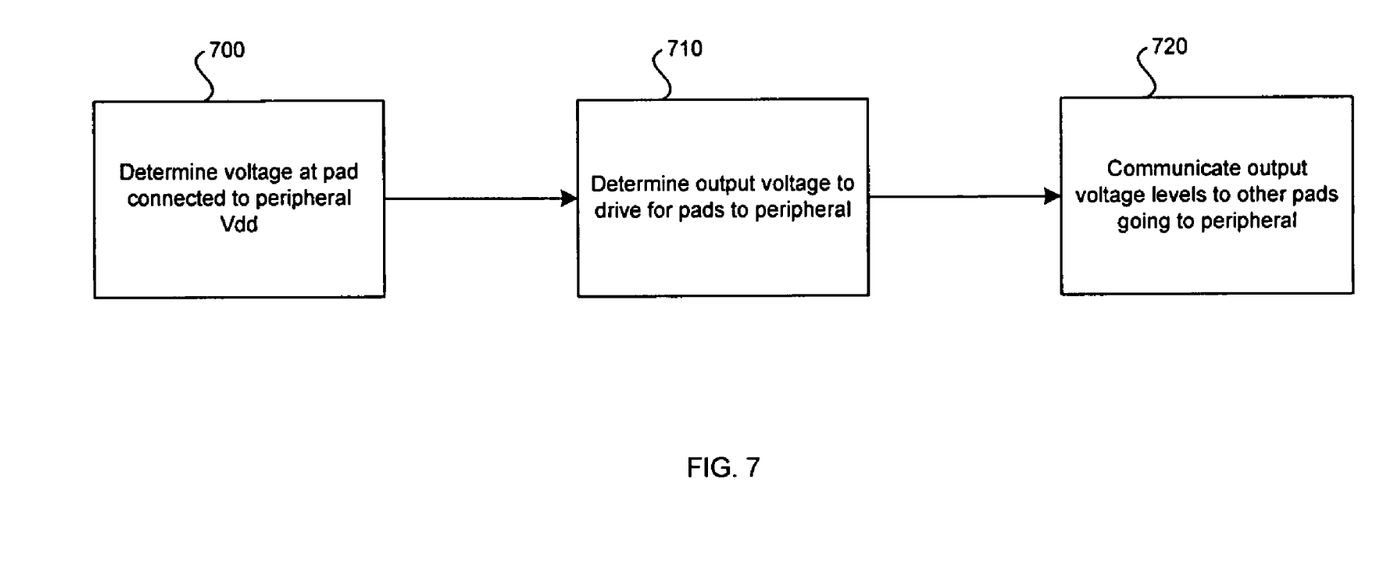
FIG. 7 is a flow diagram illustrating exemplary auto-sense pad for output voltage control, in accordance with an embodiment of the invention.

FIG. 7 is a flow diagram illustrating exemplary auto-sense pad for output voltage control, in accordance with an embodiment of the invention. Referring to FIG. 7, in step 700, the auto-sense pad may detect the voltage level of the peripheral voltage Vdd that may be communicated to it. In step 710, the auto-sense pad may determine the correct voltage range to use for output signals. In step 720, the auto-sense pad may configure the output pads to generate output signals that fall within appropriate voltage range.

Referring to FIG. 7, and with respect to FIGS. 1a, 2 and 6, in step 700, when a mobile multimedia system, for example, the mobile multimedia system 105, powers up, the various Vdd voltages utilized by the plurality of peripherals may be communicated to the auto-sense pads, for example, the auto-sense pads 600, 610, and 620, on an integrated circuit, for example, the mobile multimedia processor 204. For example, the auto-sense pads 600, 610 and 620 may determine the voltage levels of the Vdd voltages that may be communicated to them. In step 710, each auto-sense pad may then determine the correct output voltage levels that may be needed to communicate output signals to the devices that may be utilizing that Vdd voltage level. In step 720, each of the auto-sense pads 600, 610, and 620 may then communicate the necessary output voltage levels to the output pads, which may include bidirectional pads, to which it may be connected. Each auto-sense pad 600, 610 or 620 may be connected to those output pads that may be coupled to the devices that use the Vdd voltage that the auto-sense pad detected.

The auto-sense pad may have been described as detecting the voltage level during power-up of the mobile multimedia system 105, for example, the mobile multimedia processor 204. This may be when the mobile multimedia processor 204 (FIG. 2) and/or a peripheral circuitry, for example, the external memory 101n (FIG. 1a), powers up. However, a peripheral circuitry may also be inserted while the mobile multimedia system 105 is powered up. While this peripheral circuitry, for example, the external memory 101n, is powered by the mobile multimedia system 105 (FIG. 1), the external memory 101n may modify the voltage level to a different supply voltage level for use by the circuitry in the external memory 101n. Accordingly, the modified voltage level may be communicated to the auto-sense pad, and the auto-sense pad may adjust the drive strengths of signals that are communicated to the external memory 101n.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for controlling pads, the method comprising:
   detecting on a mobile multimedia processor chip, an input voltage received at an auto-sense pad integrated on said mobile multimedia processor chip, said auto-sense pad coupling said mobile multimedia processor to at least one bus interface; and
   adjusting drive strengths of at least one other pad integrated on said mobile multimedia processor chip based on said detected input voltage.

2. The method according to claim 1, wherein said received input voltage is a power supply voltage of said at least one peripheral device.

3. The method according to claim 1, wherein said at least one other pad comprises at least one of: an output pad and a bidirectional pad.

4. The method according to claim 1, comprising receiving said input voltage during power-up of said mobile multimedia processor chip.

5. The method according to claim 1, comprising receiving said input voltage during power-up of said at least one peripheral device.

6. The method according to claim 1, comprising dynamically detecting said input voltage while said mobile multimedia processor chip is powered-up.

7. The method according to claim 1, wherein said adjusting drive strength comprises adjusting a rise time of signals output by said at least one other pad.

8. The method according to claim 1, wherein said adjusting drive strength comprises adjusting a current drive of said at least one other pad to adjust a rise time of output signals.

9. The method according to claim 1, wherein said adjusting drive strength comprises adjusting a fall time of signals output by said at least one other pad.

10. A system for controlling pads, the system comprising:
    one or more circuits operable to detect on a mobile multimedia processor chip, an input voltage received at an auto-sense pad integrated on said mobile multimedia processor chip, said auto-sense pad operable to couple said mobile multimedia processor to at least one bus interface; and
    said one or more circuits being operable to adjust drive strengths of at least one other pad integrated on said mobile multimedia processor chip based on said detected input voltage.

11. The system according to claim 10, wherein said received input voltage is a power supply voltage of said at least one peripheral device.

12. The system according to claim 10, wherein said at least one other pad comprises at least one of: an output pad and a bidirectional pad.

13. The system according to claim 10, wherein said one or more circuits are operable to receive said input voltage during power-up of said mobile multimedia processor chip.

14. The system according to claim 10, wherein said one or more circuits are operable to receive said input voltage during power-up of said at least one peripheral device.

15. The system according to claim 10, wherein said one or more circuits are operable to dynamically detect said input voltage while said mobile multimedia processor chip is powered-up.

16. The system according to claim 10, wherein said adjusting drive strength comprises adjusting a rise time of signals output by said at least one other pad.

17. The system according to claim 10, wherein said adjusting drive strength comprises adjusting a current drive of said at least one other pad to adjust a rise time of output signals.

18. The system according to claim 10, wherein said adjusting drive strength comprises adjusting a fall time of signals output by said at least one other pad.

19. The system according to claim 10, wherein said adjusting drive strength comprises adjusting a current drive of said at least one other pad to adjust a fall time of output signals.

20. A system for controlling pads, the system comprising:
a mobile multimedia processor chip comprising an auto-sense pad, one or more additional pads, and one or more circuits, wherein:
   said one or more circuits are operable to detect an input voltage received at said auto-sense pad;
   said one or more circuits are operable to adjust drive strengths of said at least one additional pad based on said detected input voltage; and
   each of said one or more additional pads is one of an input pad, an output pad, and a bidirectional pad, and is operable to select pull-up and pull-down capabilities.

* * * * *